(12) United States Patent
Muro et al.

(10) Patent No.: US 12,041,872 B2
(45) Date of Patent: Jul. 23, 2024

(54) AUTONOMOUS WORK MACHINE, AUTONOMOUS WORK SYSTEM, METHOD OF CONTROLLING AUTONOMOUS WORK MACHINE, AND STORAGE MEDIUM

(71) Applicant: HONDA MOTOR CO., LTD., Tokyo (JP)

(72) Inventors: Keiji Muro, Wako (JP); Minami Kigami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 582 days.

(21) Appl. No.: 17/313,119

(22) Filed: May 6, 2021

(65) Prior Publication Data

US 2021/0251137 A1  Aug. 19, 2021

Related U.S. Application Data

(63) Continuation of application No. PCT/JP2018/042330, filed on Nov. 15, 2018.

(51) Int. Cl.
*G06F 17/00* (2019.01)
*A01D 34/00* (2006.01)
(Continued)

(52) U.S. Cl.
CPC ......... *A01D 34/008* (2013.01); *G05D 1/0225* (2013.01); *G05D 1/0265* (2013.01); *A01D 2101/00* (2013.01)

(58) Field of Classification Search
CPC ............. A01D 34/008; A01D 2101/00; G05D 1/0225; G05D 1/0265; G05D 2201/0208; G05D 1/0274
(Continued)

(56) References Cited

U.S. PATENT DOCUMENTS 9,063,547 B2  6/2015 Yamamura et al.
10,454,287 B2  10/2019 Yamamura et al.
(Continued)

FOREIGN PATENT DOCUMENTS

EP  3591486 B1 * 11/2022 ............... G05D 1/02
ES  2655722 T3 * 2/2018 .............. B60L 53/14
(Continued)

OTHER PUBLICATIONS

TM-1000_Technical_Manual_EN_062719 (Year: 2019).*
International Search Report and Written Opinion for PCT/JP2018/042330 mailed Feb. 19, 2019.

*Primary Examiner* — Ronnie M Mancho
(74) *Attorney, Agent, or Firm* — Thomas | Horstemeyer, LLP

(57) ABSTRACT

An autonomous work machine that works in a work area while autonomously traveling in the work area, comprises a plurality of magnetic detection sensors each configured to detect a magnetic field during energization of a station wire which is configured to guide the autonomous work machine to a charging station for power supply, and a specification unit configured to specify, when the autonomous work machine is to move from a charging position of the charging station to the work area or when the autonomous work machine is to move from the work area to the charging position, an angle of the autonomous work machine with respect to the charging station based on a comparison of detection results of the magnetic detection sensors.

14 Claims, 10 Drawing Sheets

(51) Int. Cl.
  *G05D 1/00*      (2006.01)
  *A01D 101/00*    (2006.01)
(58) Field of Classification Search
  USPC .......................................................... 700/258
  See application file for complete search history.

(56) References Cited

U.S. PATENT DOCUMENTS

| | | | |
|---|---|---|---|
| 11,385,654 B2 * | 7/2022 | Yamamura | G05D 1/0225 |
| 2013/0211646 A1 | 8/2013 | Yamamura et al. | |
| 2016/0285288 A1 * | 9/2016 | Yamamura | G05D 1/0265 |
| 2017/0282735 A1 | 10/2017 | Yamamura et al. | |
| 2019/0369639 A1 | 12/2019 | Yamamura et al. | |

FOREIGN PATENT DOCUMENTS

| | | | |
|---|---|---|---|
| JP | 2009-15611 A | | 1/2009 |
| JP | 2013-165588 A | | 8/2013 |
| JP | 2017-49933 A | | 3/2017 |
| JP | 2017-182635 A | | 10/2017 |
| JP | JP-WO2018158844 A1 | * | 1/2018 |
| WO | 2018/158844 A1 | | 9/2018 |
| WO | 2020/100263 A1 | | 5/2020 |

* cited by examiner

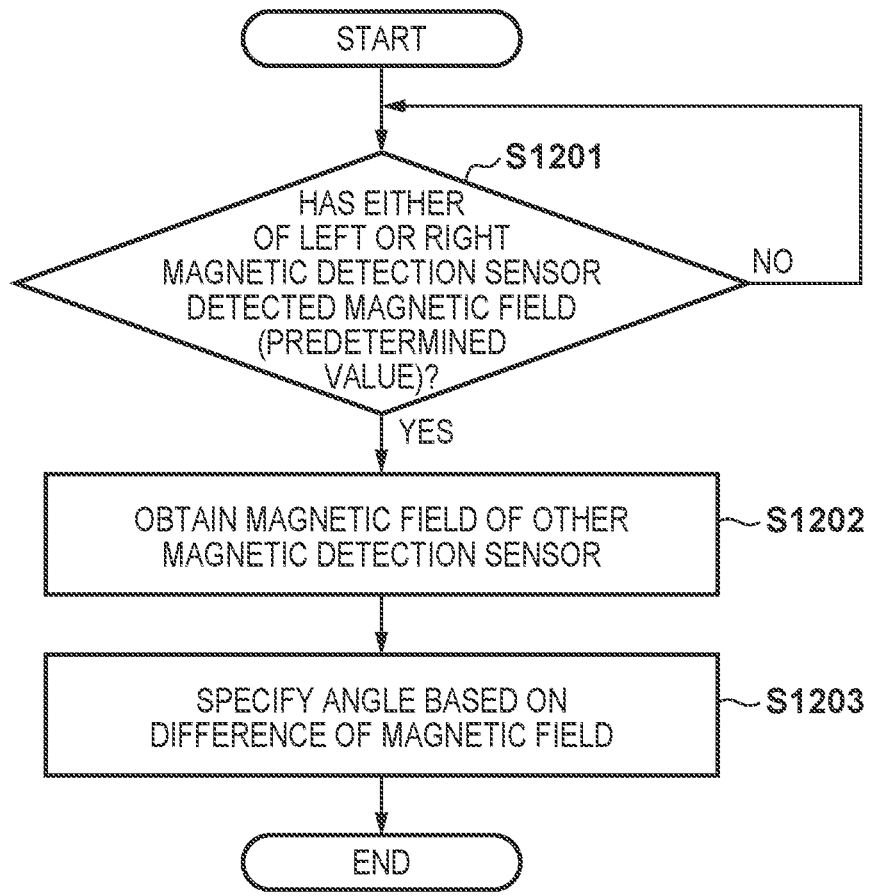

AUTONOMOUS WORK MACHINE, AUTONOMOUS WORK SYSTEM, METHOD OF CONTROLLING AUTONOMOUS WORK MACHINE, AND STORAGE MEDIUM

CROSS-REFERENCE TO RELATED APPLICATION(S)

This application is a continuation of International Patent Application No. PCT/JP2018/042330 filed on Nov. 15, 2018, the entire disclosure of which is incorporated herein by reference.

BACKGROUND OF THE INVENTION

Field of the Invention

The present invention relates to an autonomous work machine, an autonomous work system, a method of controlling the same, and a storage medium.

Description of the Related Art

PTL 1 discloses, for example, an autonomous work machine that works, based on power charged from a charging station, in a work area while autonomously traveling in the work area. The autonomous work machine starts moving from the charging station, returns to the charging station after traveling while detecting the magnetic field strength of an area wire installed around the perimeter of the work area, generates an area map indicating the shape of the work area, and works in a work area while traveling in the work area based on the generated area map.

In order to dock with the charging station even if the autonomous work machine has entered the charging station diagonally when the autonomous work machine has returned from the work area, the width of a dockable angle of this autonomous work machine is formed to have a predetermined allowance.

CITATION LIST

Patent Literature

PTL 1: Japanese Patent Laid-Open No. 2013-165588

SUMMARY OF THE INVENTION

Technical Problem

However, in the arrangement of the conventional technique, if a shift in an angle between a track for moving from the charging station and a track for returning to the charging station occurs, the shape of the area map will be recognized in a shape that has been deformed by the amount of the shift between the tracks, and the autonomous work machine may not be able to accurately perform work in the work area based on the area map.

In consideration of the above problem, the present invention provides an autonomous work technique that allows the angle of the autonomous work machine with respect to the charging station to be specified.

Solution to Problem

According to one aspect of the present invention, there is provided an autonomous work machine that works in a work area while autonomously traveling in the work area, characterized by comprising: a plurality of magnetic detection sensors each configured to detect a magnetic field during energization of a station wire which is configured to guide the autonomous work machine to a charging station for power supply; and a specification unit configured to specify, when the autonomous work machine is to move from a charging position of the charging station to the work area or when the autonomous work machine is to move from the work area to the charging position, an angle of the autonomous work machine with respect to the charging station based on a comparison of detection results of the magnetic detection sensors.

Advantageous Effects of Invention

According to the present invention, the angle of the autonomous work machine with respect to the charging station can be specified.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

FIG. 12 is a flowchart for explaining the procedure of processing executed by an autonomous work machine according to the third embodiment; and FIG. 13 is a view exemplifying a table in which a magnetic field strength difference has been associated with an angle.

DESCRIPTION OF EMBODIMENTS

First Embodiment

Embodiments of the present invention will be described hereinafter with reference to the accompanying drawings.

Components described in the embodiments are merely exemplary and are not limited by the following embodiments.

(Outline of Autonomous Work Machine)

Figure 1:
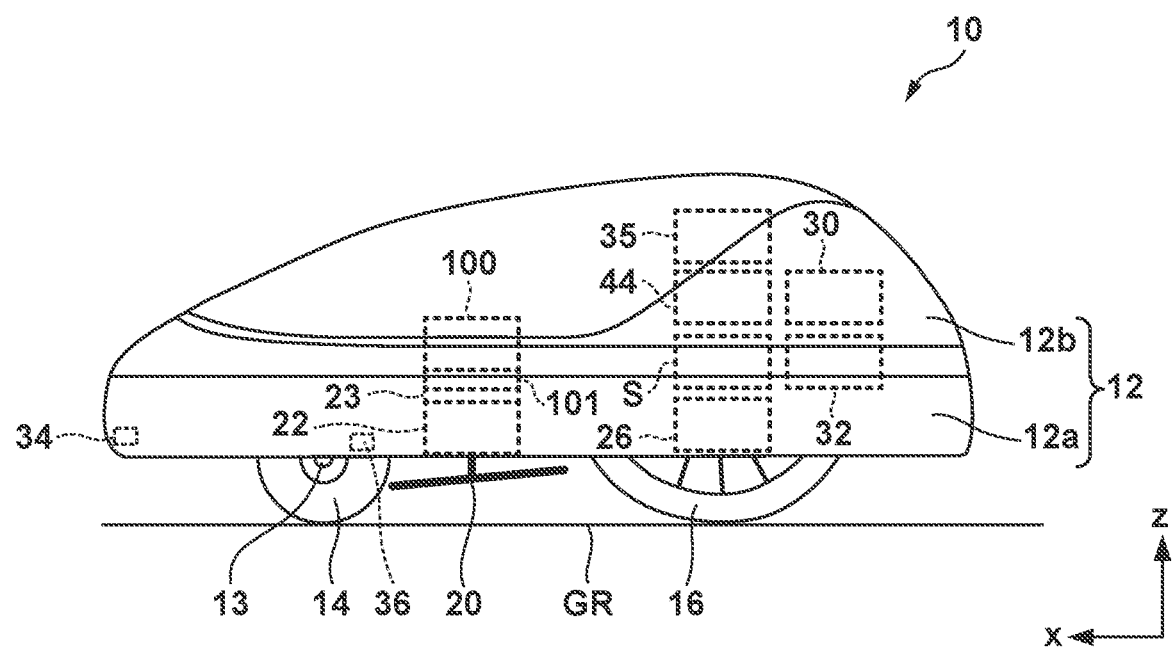
FIG. 1 is a schematic view in which an autonomous work machine according to an embodiment is viewed from the side.

FIG. 1 is a schematic view in which an autonomous work machine is viewed from the side. In the following description, the direction of travel (vehicle longitudinal direction) of the autonomous work machine in a side view, a lateral direction (vehicle width direction) orthogonal to the direction of travel, and a perpendicular direction orthogonal to the direction of travel and the lateral direction are defined as a front-and-rear direction, a left-and-right direction, and a vertical direction, respectively, and the arrangement of each component will be explained in accordance with these directions.

In FIG. 1, reference numeral 10 denotes an autonomous work machine that works in a work area while autonomously traveling in the work area. The autonomous work machine 10 can function as, for example, a lawn mower, snow removal equipment, a tiller, or the like that can work while autonomously traveling in a work area. However, the example of the autonomous work machine is merely an example, and the present invention is applicable to other kinds of work machines. In the following description, the arrangement of a lawn mower whose work area is a plot of lawn will be exemplified to describe the embodiments of the present invention.

As shown in FIG. 1, the autonomous work machine 10 includes a vehicle body 12, a stay 13, front wheels 14, rear wheels 16, a blade 20, a work motor 22, a motor holding member 23, a blade height adjustment motor 100, and a translation mechanism 101. The autonomous work machine 10 also includes travel motors 26, various kinds of sensors S, an electronic control unit (ECU) 44, a charging unit 30, a battery 32, a charging terminal 34, a notification unit 35, and a wireless charging unit 36.

The vehicle body 12 of the autonomous work machine 10 includes a chassis 12a and a frame 12b attached to the chassis 12a. Two front wheels 14 (a left front wheel 14L and a right front wheel 14R) as left and right small-diameter wheels are fixed to the front part of the chassis 12a via the stay 13. Two rear wheels 16 (a left rear wheel 16L and a right rear wheel 16R) as left and right large-diameter wheels are attached to the rear part of the chassis 12a.

The blade 20 is a rotary blade for lawn mowing attached near the central position of the chassis 12a. The work motor 22 is an electric motor arranged above the blade 20. The blade 20 is connected to and rotated by the work motor 22. The motor holding member 23 holds the work motor 22. The rotation of the motor holding member 23 is regulated with respect to the chassis 12a. In addition, the vertical movement of the motor holding member 23 is permitted by a combination of a guide rail and a slider which can move vertically by being guided by the guide rail.

The blade height adjustment motor 100 is a motor for adjusting the height of the blade 20 in the vertical direction from a ground surface GR. The translation mechanism 101 is connected to the blade height adjustment motor 100, and converts the rotation of the blade height adjustment motor 100 into a vertical translational movement. The translation mechanism 101 is also connected to the motor holding member 23 for holding the work motor 22.

The rotation of the blade height adjustment motor 100 is converted into the translational movement (vertical movement) by the translation mechanism 101, and this translational movement is transmitted to the motor holding member 23. The translational movement (vertical movement) of the motor holding member 23 causes the work motor 22 held by the motor holding member 23 to translationally move (vertically move). The height of the blade 20 from the ground surface GR can be adjusted by the vertical movement of the work motor 22.

The travel motors 26 (a left travel motor 26L and a right travel motor 26R) are two electric motors (motors) attached to the chassis 12a of the autonomous work machine 10. The two electric motors are connected to the left and right rear wheels 16. The left and right wheels are independently rotated forward (rotated in an advancing direction) or rotated backward (rotated in a reversing direction) by using the front wheels 14 as driven wheels and the rear wheels 16 as driving wheels. This allows the autonomous work machine 10 to move in various directions.

The charging terminal 34 is a charging terminal installed in the front end position of the frame 12b in the front-and-rear direction, and can receive power from a charging station ST (FIG. 4) when connected to a corresponding charging terminal 208 of the charging station. The charging terminal 34 is connected to the charging unit 30 by a wiring line, and the charging unit 30 is connected to the battery 32. The work motor 22, the travel motors 26, and the blade height adjustment motor 100 are also connected to the battery 32, and receive power from the battery 32.

The wireless charging unit 36 is arranged on the lower surface position of the frame 12b and can wirelessly receive a power supply voltage based on the magnetic field of a station wire 84. The wireless charging unit 36 is connected to the charging unit 30, and the charging unit 30 is connected to the battery 32.

The ECU 44 is an electronic control unit including a microcomputer formed on a circuit board, and controls the operation of the autonomous work machine 10. Details of the ECU 44 will be described later. The notification unit 35 notifies a user of the occurrence of an abnormality in a case in which an abnormality has occurred in the autonomous work machine 10. For example, notification can be performed by sound or display. Alternatively, notification can be performed by outputting an abnormality generation notification to an external device which is wirelessly connected to the autonomous work machine 10. The user can be notified of the occurrence of an abnormality through the external device.

(Control Block Diagram)

Figure 2:
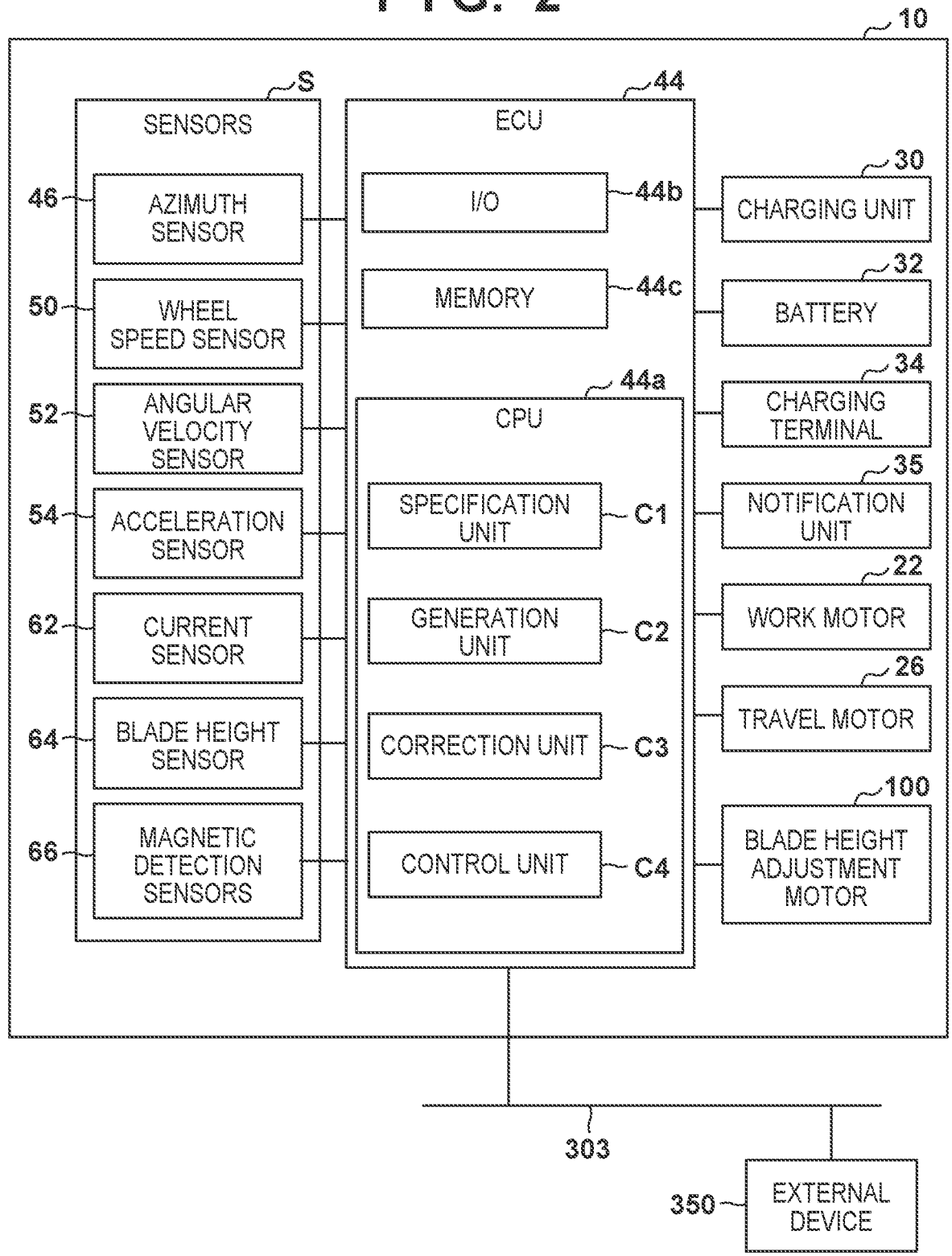
FIG. 2 is a block diagram showing the relationship of inputs/outputs of an electronic control unit (ECU) that controls the autonomous work machine according to the embodiment.

FIG. 2 is a block diagram showing the relationship of inputs/outputs of the electronic control unit (ECU) that controls the autonomous work machine 10. As shown in FIG. 2, the ECU 44 includes a CPU 44a, an I/O 44b, and a memory 44c (storage unit). The memory 44c is a ROM (Read Only Memory), an EEPROM (Electrically Erasable Programmable Read Only Memory), a RAM (Random Access Memory), or the like. The memory 44c stores a work schedule of the autonomous work machine 10, information about a work area, various kinds of programs for controlling the operation of the autonomous work machine 10, and a map of the work area. The generation of a map of the work area will be described later. The ECU 44 can operate as each processing unit for implementing the present invention by reading out and executing a program stored in the memory 44c.

The ECU 44 is connected to the various kinds of sensors S. The sensors S include an azimuth sensor 46, a wheel speed sensor 50, an angular velocity sensor 52, an acceleration sensor 54, a current sensor 62, a blade height sensor 64, and magnetic detection sensors 66.

The azimuth sensor 46 is a sensor for obtaining information of the direction of the autonomous work machine 10, and detects the azimuth corresponding to the terrestrial magnetism. The wheel speed sensor 50, the angular velocity sensor 52, and the acceleration sensor 54 are sensors for obtaining information on the state of the movement of the autonomous work machine 10. The wheel speed sensor 50 detects the wheel speeds of the left and right rear wheels 16. The angular velocity sensor 52 detects the angular velocity around the vertical axis (the z-axis in the perpendicular direction) in the barycentric position of the autonomous work machine 10. The acceleration sensor 54 detects accelerations in the directions of three perpendicular axes, that is, the x-, y-, and z-axes, which act on the autonomous work machine 10.

The current sensor 62 detects the current consumption (power consumption) of the battery 32. The detection result of the current consumption (power consumption) is saved in the memory 44*c* of the ECU 44. When a predetermined power amount is consumed and the power amount stored in the battery 32 becomes equal to or lower than a threshold value, the ECU 44 executes control to return the autonomous work machine 10 to the charging station ST (FIGS. 3A, 3B, and 4) in order to charge the autonomous work machine 10.

The blade height sensor 64 detects the height of the blade 20 from the ground surface GR. The blade height sensor 64 outputs the detection result to the ECU 44. Under the control of the ECU 44, the blade height adjustment motor 100 is driven, and the blade 20 vertically moves, thereby adjusting the height from the ground surface GR.

The magnetic detection sensors 66 (a right magnetic detection sensor 66R and a left magnetic detection sensor 66L) are arranged at symmetrical positions to each other in the left-and-right direction of the autonomous work machine 10. Each magnetic sensor outputs a signal indicating the magnitude of the magnetic field (magnetic field strength) to the ECU 44. The plurality of magnetic detection sensors 66 (the right magnetic detection sensor 66R and the left magnetic detection sensor 66L) can detect, for example, the magnetic field of an area wire 82, which is installed around the perimeter of a work area AR, when the area wire 82 is energized. The plurality of magnetic detection sensors 66 can detect the magnetic field of the energized station wire 84 for guiding the autonomous work machine 10 to the charging station ST for power supply.

The outputs from the various sensors S are input to the ECU 44 via the I/O 44*b*. Based on the outputs from the various sensors S, the ECU 44 supplies power from the battery 32 to the travel motors 26, the work motor 22, and the height adjustment motor 100. The ECU 44 controls the travel motors 26 by outputting a control value via the I/O 44*b*, thereby controlling travel of the autonomous work machine 10. The ECU 44 also controls the height adjustment motor 100 by outputting a control value via the I/O 44*b*, thereby controlling the height of the blade 20. Furthermore, the ECU 44 controls the work motor 22 by outputting a control value via the I/O 44*b*, thereby controlling the rotation of the blade 20. The I/O 44*b* can function as a communication interface, and can communicate with an external device (for example, a communication device such as a smartphone, a personal computer, or the like) 350 via a network 303 by wired or wireless communication.

ECU 44 includes a specification unit C1, a generation unit C2, a correction unit C3, and a control unit C4 as functional components for implementing the present invention by reading out and executing programs stored in the memory 44*c*.

When the autonomous work machine 10 is to move from a charging position of the charging station ST to the work area AR or move from the work area AR to the charging position, the specification unit C1 specifies the angle of the autonomous work machine with respect to the charging station ST based on a comparison of the detection results of the magnetic detection sensors. Here, a charging position is a position where the charging terminal 34 can be connected to the charging terminal 208 of the charging station ST or a position where the wireless charging unit 36 can receive wireless power supply from the station wire 84.

The generation unit C2 generates, based on position information obtained during the travel along the perimeter of the work area AR, a map MP that indicates the shape of the work area AR.

The correction unit C3 corrects the map MP based on a difference between an angle specified when the autonomous work machine 10 moves from the charging position of the charging station ST to the work area and an angle specified when the autonomous work machine moves from the work area to the charging position.

The control unit C4 controls, based on the corrected map, an autonomous travel operation of the autonomous work machine in the work area AR. More specific processing operations of the respective functional components (C1 to C4) of the autonomous work machine 10 will be described in detail later.

(Outline of Work Area)

Figure 3A:
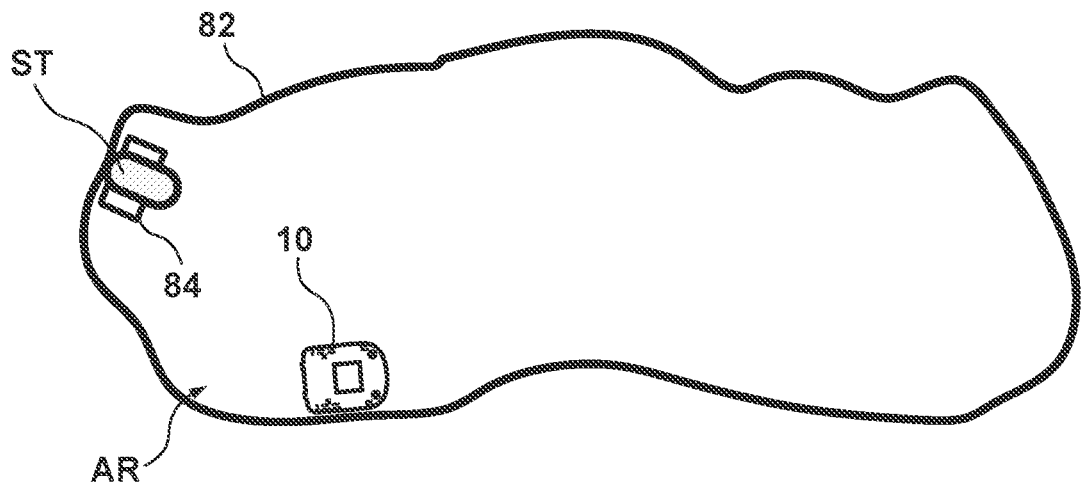
FIG. 3A is a view for explaining the outline of a work area.
Figure 3B:
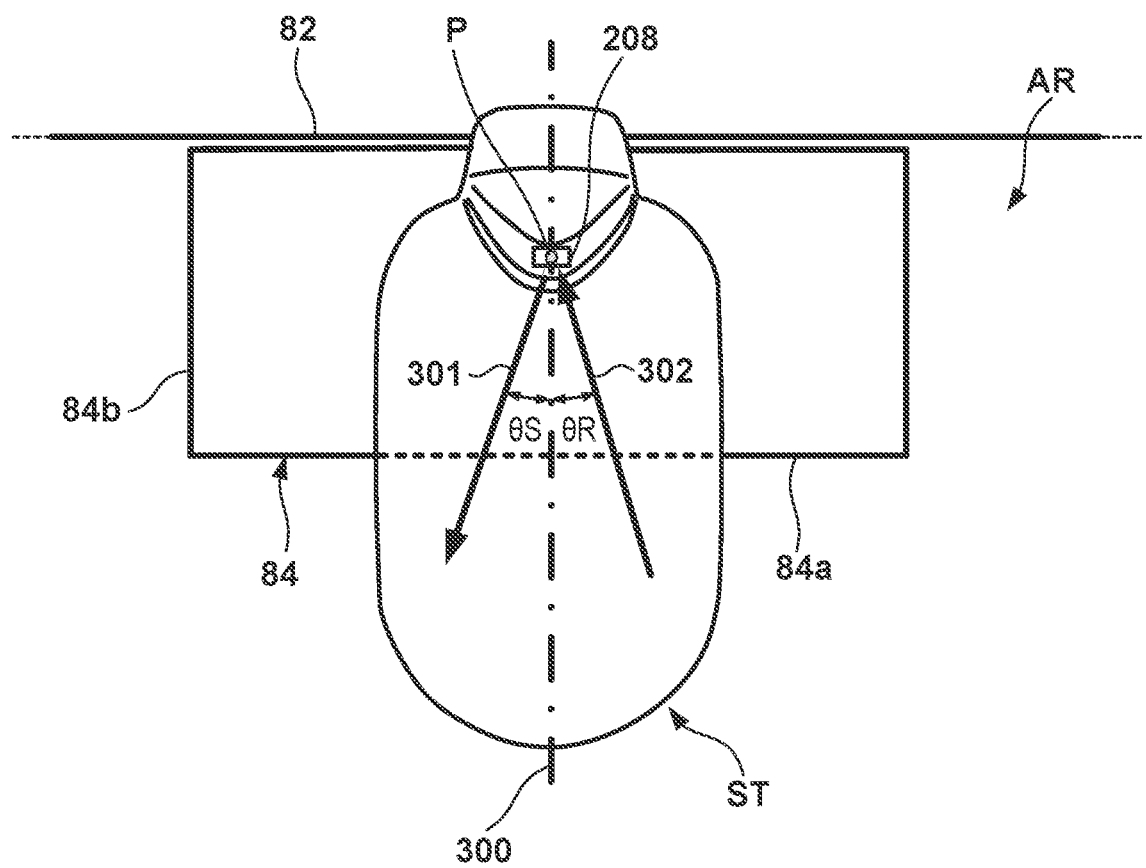
FIG. 3B is a view schematically showing a charging station and a station wire.

FIG. 3A is a view for explaining the outline of a work area, and FIG. 3B is a view schematically showing the charging station ST and the station wire 84 arranged near the charging station ST. The autonomous work machine 10 that works in the work area AR while autonomously traveling in the work area AR and the charging station ST for supplying power to the autonomous work machine 10 form an autonomous work system.

As shown in FIG. 3A, the work area AR is delineated by the area wire (electrical wire)82 that is installed around the perimeter (boundary) of the work area AR by being buried or the like in the ground along the perimeter. The charging station ST for charging the battery 32 included in the autonomous work machine 10 is installed at the perimeter (boundary) or inside the work area AR. The station wire 84 is arranged near the charging station ST. The sizes of the area wire 82, the station wire 84, the charging station ST, and the autonomous work machine 10 are shown schematically in FIG. 3A, and the actual scale with respect to the work area AR is not limited to these.

As shown in FIG. 3B, the charging station ST includes the charging terminal 208. When the autonomous work machine 10 enters the charging station ST, the charging of the battery 32 is started by connecting the charging terminal 34 of the autonomous work machine 10 and the charging terminal 208 of the charging station ST to each other.

The width of a dockable angle of each of the charging terminal 208 of the charging station ST and the charging terminal 34 of the autonomous work machine 10 is formed to have a predetermined allowance so that the autonomous work machine can be connected (docked) to the charging terminal 208 of the charging station ST even if the autonomous work machine enters the charging station ST diagonally when the autonomous work machine returns from the work area AR to the charging station ST.

An alternating long and short dashed line (reference) 300 that passes through the center of the charging station ST in a planar view will be the reference used to specify the shift of an angle. In FIG. 3B, an arrow 301 exemplifies a track taken when the autonomous work machine 10 moves from a charging position (the connection position with the charging terminal 208) of the charging station ST to the work area AR. Also, an arrow 302 exemplifies a track taken when the autonomous work machine 10 moves from the work area AR to the charging position (the connection position with the charging terminal 208) of the charging station ST.

The specification unit C1 specifies, based on a comparison of the detection results of the magnetic detection sensors (the right magnetic detection sensor 66R and the left magnetic detection sensor 66L), the angle of the autonomous work machine 10 with respect to the reference 300 of the charging station. FIG. 3B shows that the track 301 taken when the autonomous work machine 10 moves from the charging position (the connection position with the charging terminal 208) of the charging station ST to the work area AR is shifted from the reference 300 by an angle θS and the track 302 taken when the autonomous work machine 10 moves from the work area AR to the charging position (the connection position with the charging terminal 208) of the charging station ST is shifted from the reference 300 by an angle θR.

The station wire 84 is buried near the charging station ST, and the station wire 84 generates, based on the current from the charging station ST, a magnetic field used to guide the autonomous work machine 10 to the charging station ST. As shown in FIG. 3B, the station wire 84 is arranged in a rectangular shape in the work area AR. In the work area AR, the station wire 84 includes, as this rectangular arrangement, a wiring structure that includes first station wire portions 84a, which are arranged in a direction that intersects with the charging station ST, and second station wire portions 84b, which are arranged in a direction that does not intersect with the charging station ST.

To prevent the magnetic detection sensors 66 from being influenced by the magnetic field from each second station wire portion 84b (each short side of the rectangle) of the station wire 84 when the autonomous work machine 10 is to move above the first station wire portion 84a (the long side of the rectangle) of the station wire 84, it is preferable for the station wire 84 to have a rectangular wiring structure in which the first station wire portions 84a are longer than the second station wire portions 84b.

Note that the wiring line shape of the station wire 84 is not limited to a rectangle. For example, if the position where the alternating long and short dashed line (reference 300) and the charging terminal 208 of the charging station ST intersect is set as a reference position P in FIG. 3B, the shape of the wiring line suffices to be arranged so that the distance from the reference position P of the charging station ST to the station wire 84 will not be constant.

(Arrangement of Charging Station ST)

Figure 4:
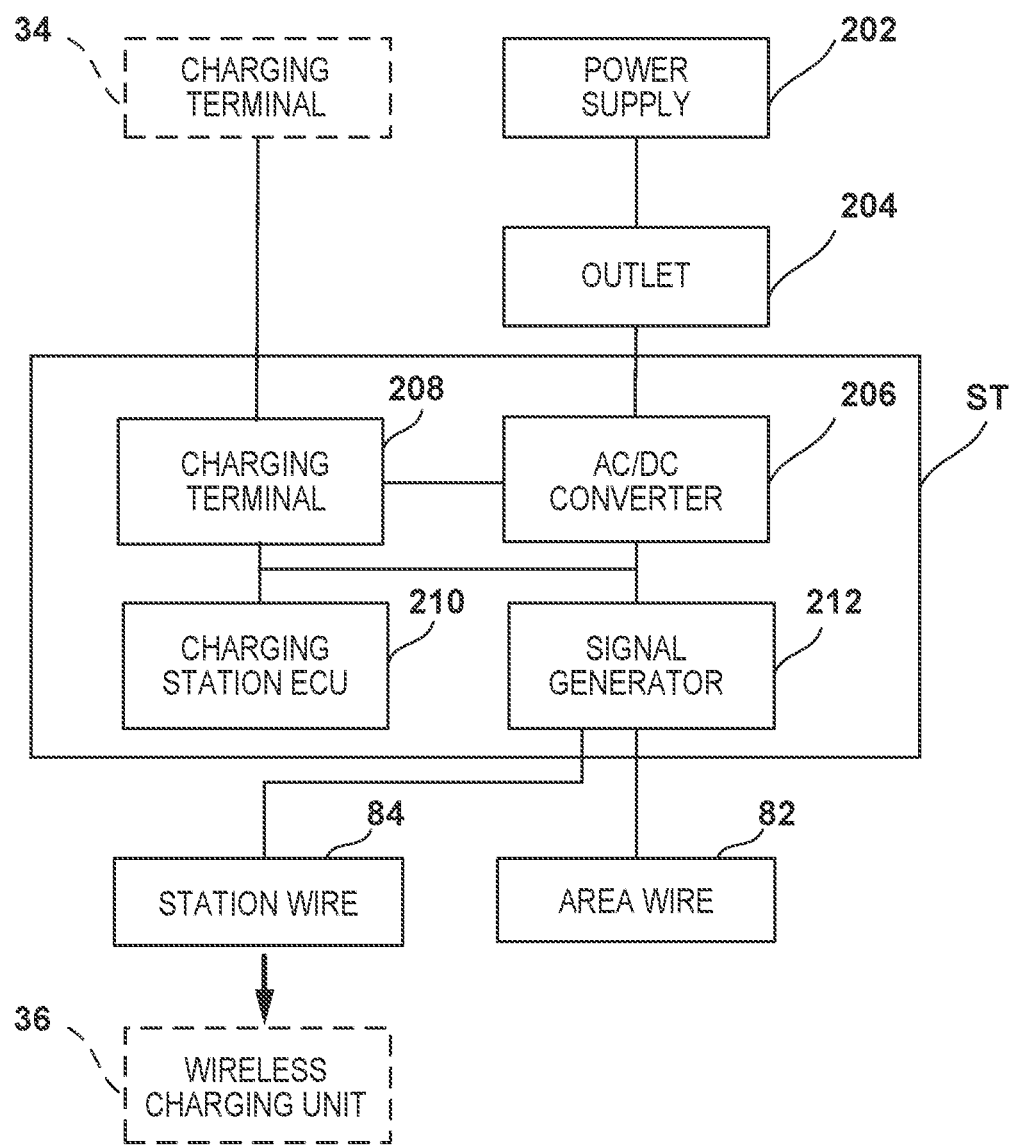
FIG. 4 is a block diagram showing the arrangement of a charging station ST.

FIG. 4 is a block diagram showing the arrangement of the charging station ST. As shown in FIG. 4, the charging station ST is connected to a power supply 202 via an electrical outlet 204. The charging station ST includes an AC/DC converter 206, the charging terminal 208, a signal generator 212, and a charging station ECU (electronic control unit) 210 which is formed by a microcomputer that controls the operations of the AC/DC converter 206 and the signal generator 212.

In the charging station ST, the alternating current voltage supplied from the power supply 202 through the electrical outlet 204 is converted into a predetermined direct current voltage by the AC/DC converter 206 and supplied to the charging terminal 208. When the autonomous work machine 10 that has returned to a charging ST 200 is connected (docked) by connecting the charging terminal 34 to the charging terminal 208 of the charging station ST, the battery 32 of the autonomous work machine 10 is charged by the voltage supplied via the charging terminal 34 and the charging terminal 208.

The output from the AC/DC converter 206 is supplied to the signal generator 212 and the charging station ECU 210. The charging station ECU 210 controls the operation of the signal generator 212 based on the output from the AC/DC converter 206.

The signal generator 212 converts the direct current, which has been adjusted by the AC/DC converter 206 under a control instruction from the charging station ECU 210, into predetermined current signals, and supplies different current signals to the area wire 82 and the station wire 84. Based on the current signals from the signal generator 212, the area wire 82 and the station wire 84 generate different kinds (for example, different frequencies) of electromagnetic waves from each other. As a result, the magnetic detection sensors 66 of the autonomous work machine 10 can discriminate and detect the electromagnetic waves of the area wire 82 and the electromagnetic waves of the station wire 84 without mutual interference.

When generating the map MP which is to indicate the outer shape of the work area AR, the autonomous work machine 10 will travel along the perimeter of the work area AR by detecting the electromagnetic waves of the area wire 82 by the magnetic detection sensors 66. When returning to the charging station ST, the autonomous work machine 10 will return to the charging station ST by detecting the electromagnetic waves of the station wire 84 by the magnetic detection sensors 66.

(Generation of Map MP)

The generation of the map MP that shows the outer shape of the work area AR will be described next. The autonomous work machine 10 will start moving from the charging station ST and perform a trace travel operation around the perimeter of the work area AR (FIG. 4). By performing the trace travel operation before executing work in the work area AR, the ECU 44 of the autonomous work machine 10 is able to recognize (grasp) the work area AR, more specifically, the boundary of the work area AR. The lap direction in which the autonomous work machine performs the trace travel operation may be clockwise or counterclockwise.

Figure 5:
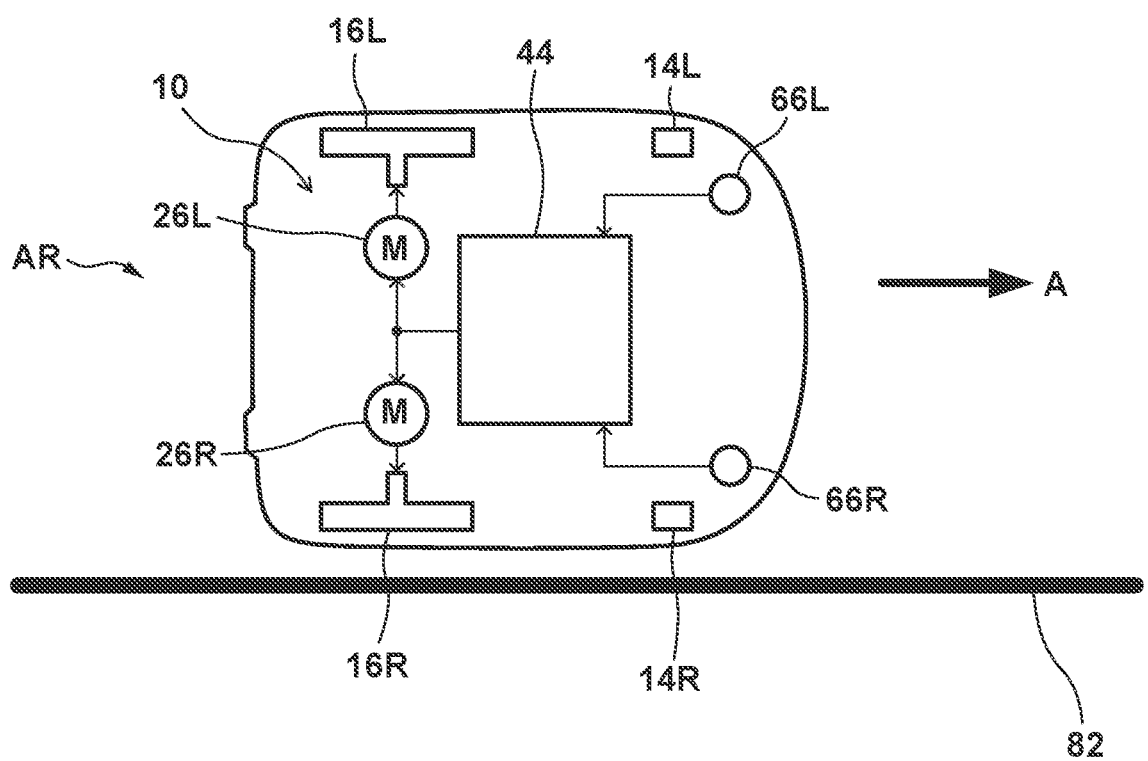
FIG. 5 is a view for explaining an operation of the autonomous work machine during a trace travel operation.

FIG. 5 is a view for explaining the operation of the autonomous work machine 10 during a trace travel operation. As shown in FIG. 5, during the trace travel operation, the autonomous work machine 10 will travel to take a lap around the perimeter by moving in an arrow A direction so that one magnetic detection sensor (for example, 66L) of the pair of left and right magnetic detection sensors 66 (the left magnetic detection sensor 66L and the right magnetic detection sensor 66R) is positioned on the far side from the area wire 82 while the other magnetic detection sensor (for example, 66R) is positioned on the near side of the area wire 82. Note that although FIG. 5 shows an example in which the right magnetic detection sensor 66R is positioned on the near side of the area wire 82, the autonomous work machine 10 is also capable of performing the trace travel operation so that the right magnetic detection sensor 66R will detect the magnetic field above the area wire 82.

The ECU 44 of the autonomous work machine 10 monitors the output from the right magnetic detection sensor 66R and controls the travel motors 26 (the left travel motor 26L and the right travel motor 26R) so that the magnetic field strength detected by the right magnetic sensor will be a predetermined value. As a result, the right magnetic detection sensor 66R can be brought close to the area wire 82, and the autonomous work machine can travel above the area wire 82 while maintaining the magnetic field strength detected by the right magnetic sensor 66R at the predetermined value.

The trace travel operation is started, for example, from a state in which the charging terminal 34 of the autonomous work machine 10 is connected to the charging terminal 208 of the charging station ST, and is ended when the charging terminal 34 of the autonomous work machine 10 has been reconnected to the charging terminal 208 of the charging station ST after the autonomous work machine 10 has traveled to take a lap along the area wire 82.

In the functional arrangement of the autonomous work machine 10, the generation unit C2 generates the map MP that indicates the shape of the work area AR based on the position information obtained during the travel along the perimeter of the work area AR. To obtain the position information, the generation unit C2 can receive a rotation signal pulse from each of the travel motors 26 (the left travel motor 26L and the right travel motor 26R), obtain, as odometry information, the travel distance of each of the left rear wheel 16L (left driving wheel) and the right rear wheel 16R (right driving wheel) converted from the corresponding rotation pulse generation count at a predetermined time interval, and use the obtained odometry information to obtain position information of the autonomous work machine 10. In addition, the azimuth corresponding to the terrestrial magnetism is detected by the azimuth sensor 46, and the generation unit C2 obtains, as the position information of the autonomous work machine 10, the travel distance obtained as the odometry information and the azimuth information.

Figure 6:
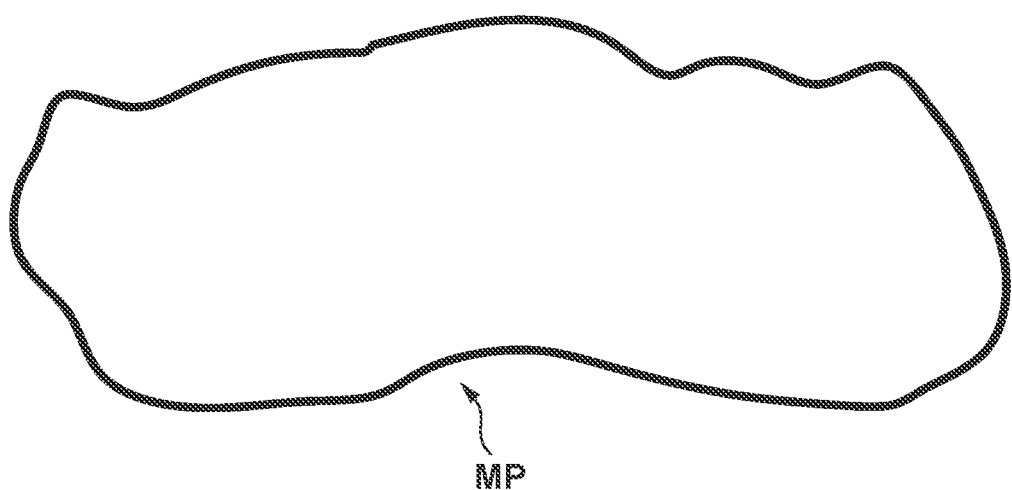
FIG. 6 is a view exemplifying a map showing the peripheral shape of the work area.

The autonomous work machine 10 starts moving from the charging position of the charging station ST, travels along the perimeter of the work area AR based on the magnetic field of the area wire 82, and returns to the charging position of the charging station ST. The generation unit C2 generates a map indicating the shape of the work area AR based on the position information obtained during the travel along the perimeter of the work area AR. That is, when traveling along the perimeter of the work area AR, the generation unit C2 stores the track of the movement of its position in the work area AR and generates the map MP (FIG. 6) that indicates the shape of the perimeter of the work area AR with the charging station ST serving as a reference (origin).

Angle Specification Processing

Angle specification processing described in FIG. 3B will be described next. In this embodiment, when the autonomous work machine 10 is to move from the charging position of the charging station ST to the work area AR, the specification unit C1 of the autonomous work machine 10 will obtain a period from the start of the movement of the autonomous work machine 10 until the strength of the magnetic field detected by each of the plurality of the magnetic detection sensors 66 (the left magnetic detection sensor 66L and the right magnetic detection sensor 66R) reaches a predetermined value, and will specify the angle of the autonomous work machine 10 with respect to the charging station ST based on the shift (time difference) between the obtained periods.

Figure 7:
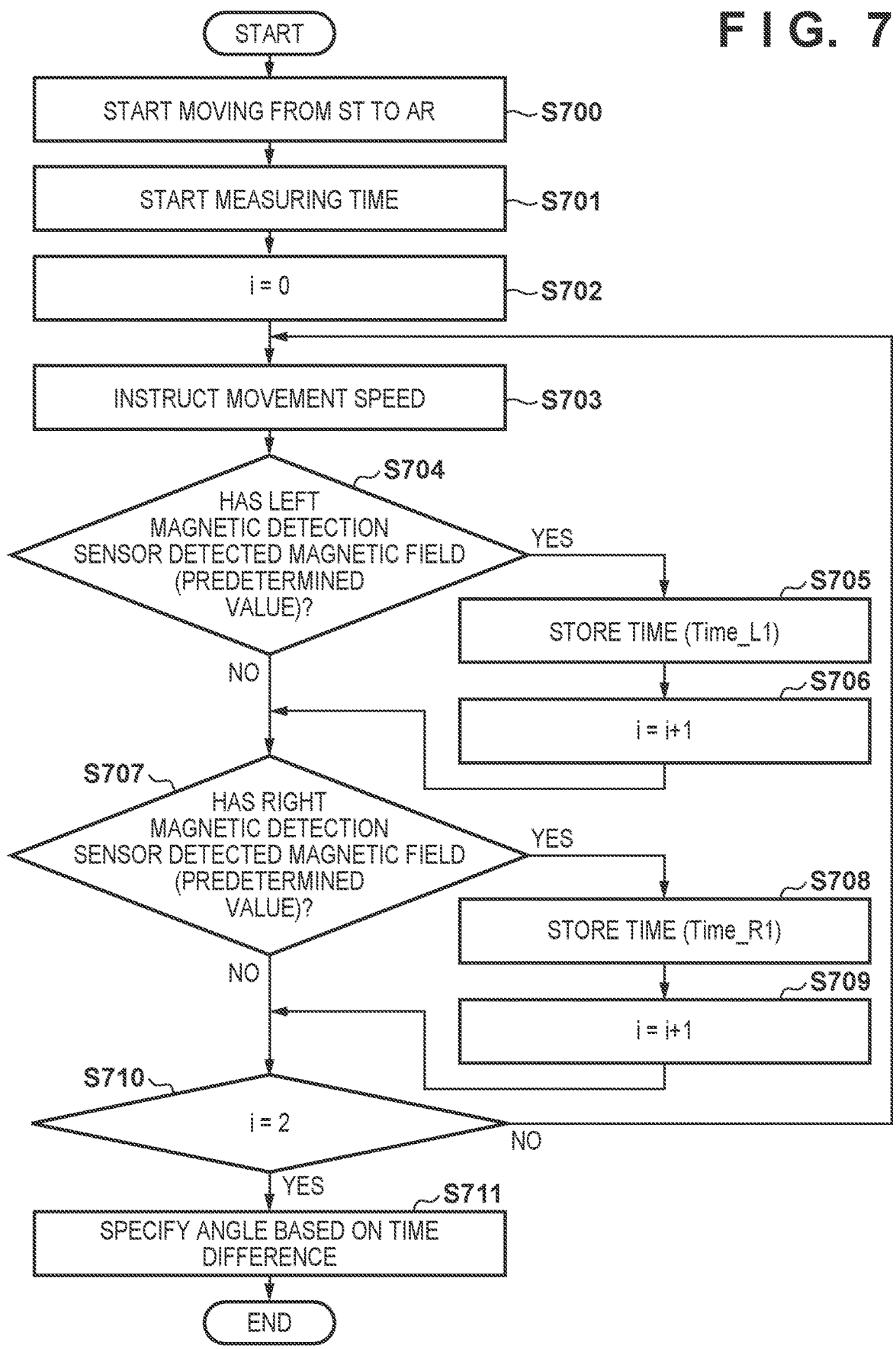
FIG. 7 is a flowchart for explaining the procedure of processing executed by an autonomous work machine according to the first embodiment.

FIG. 7 is a flowchart for explaining the procedure of processing executed by the autonomous work machine 10 according to the first embodiment. The processing procedure of FIG. 7 is executed under the overall control by the ECU 44 of the autonomous work machine 10 shown in FIG. 2.

First, in step S700, under the control of the ECU 44, the autonomous work machine 10 starts moving from the charging station ST to the work area AR. In step S701, together with the start of movement control of the autonomous work machine 10, the ECU 44 starts measuring the time by using an internal timer.

In step S702, the ECU 44 initializes a counter i. This counter is a counter for managing the number of magnetic detection sensors that have detected a magnetic field strength of a predetermined value.

In step S703, the ECU 44 controls the travel motors 26 (the left travel motor 26L and the right travel motor 26R) by issuing a movement speed instruction. To make the autonomous work machine 10 move linearly from the charging position of the charging station ST to the work area AR, the ECU 44 will control the speed so that the left travel motor 26L and the right travel motor 26R will generate similar driving forces. Note that to prevent a shift in the linear movement due to slipping during the movement from the charging position of the charging station ST to the work area AR, a non-slip mat may be placed below the charging station ST or the charging station ST itself may be formed of a non-slip mat.

In step S704, the ECU 44 determines whether the left magnetic detection sensor 66L has detected a magnetic field strength of a predetermined value. If it is determined that a magnetic field strength of a predetermined value has been detected (YES in step S704), the process advances to step S705.

In step S705, the ECU 44 stores, in the memory 44c (storage unit), a period Time_L1 from the start of the movement of the autonomous work machine 10 to the detection of the magnetic field strength of a predetermined value by the left magnetic detection sensor 66L.

In step S706, the ECU 44 counts up the value of the counter i, and advances the process to step S707.

On the other hand, if it is determined that the left magnetic detection sensor 66L has not detected a magnetic field strength of a predetermined value in the determination processing of step S704 (NO in step S704), the process will advance to step S707 without performing the processes of steps S705 and S706.

In step S707, the ECU 44 determines whether the right magnetic detection sensor 66R has detected a magnetic field strength of a predetermined value. If it is determined that a magnetic field strength of a predetermined value has been detected (YES in step S707), the process advances to step S708.

In step S708, the ECU 44 stores, in the memory 44c (storage unit), a period Time_R1 from the start of the movement of the autonomous work machine 10 to the detection of the magnetic field strength of a predetermined value by the right magnetic detection sensor 66R.

Subsequently, in step S709, the ECU 44 counts up the value of the counter i and advances the process to step S710.

On the other hand, if it is determined that the right magnetic detection sensor 66R has not detected a magnetic field strength of a predetermined value in the determination processing of step S707 (NO in step S707), the process will advance to step S710 without performing the processes of steps S708 and S709.

In step S710, the ECU 44 determines whether the value of the counter i is 2. If one of the left magnetic detection sensor 66L and the right magnetic detection sensor 66R has not detected a magnetic field strength of a predetermined value or if both of the magnetic detection sensors have not detected a magnetic field strength of a predetermined value (NO in step S710), the ECU 44 will return the process to step S703, and processing will be executed in a similar manner.

On the other hand, since the value of the counter i will be 2 when the left magnetic detection sensor 66L and the right magnetic detection sensor 66R both have detected a magnetic field strength of a predetermined value (YES in step S710), the ECU 44 will advance the process to step S711.

In step S711, the specification unit C1 will obtain a shift between the periods (time difference) based on the difference between the period Time_L1 and the period Time_R1 stored in the memory 44c, and specify the angle of the autonomous work machine 10 with respect to the charging station ST. The magnetic detection sensors 66 (the right magnetic detection sensor 66R and the left magnetic detection sensor 66L) are arranged here at positions symmetrical to each other in the left-and-right direction of the autonomous work machine 10, and the specification unit C1 specifies the angle of the autonomous work machine 10 with respect to the charging station ST by arithmetic processing based on the time difference information of the autonomous work machine 10 which is moving linearly at a predetermined movement speed. Note that the arrangement of the magnetic detection sensors is not limited to the left and right sides of the autonomous work machine. For example, the magnetic detection sensors may be arranged at the front and the rear of the autonomous work machine 10, and the angle of the autonomous work machine 10 with respect to the charging station ST can be specified by using the detection results of a pair of front and rear magnetic detection sensors.

Figure 8:
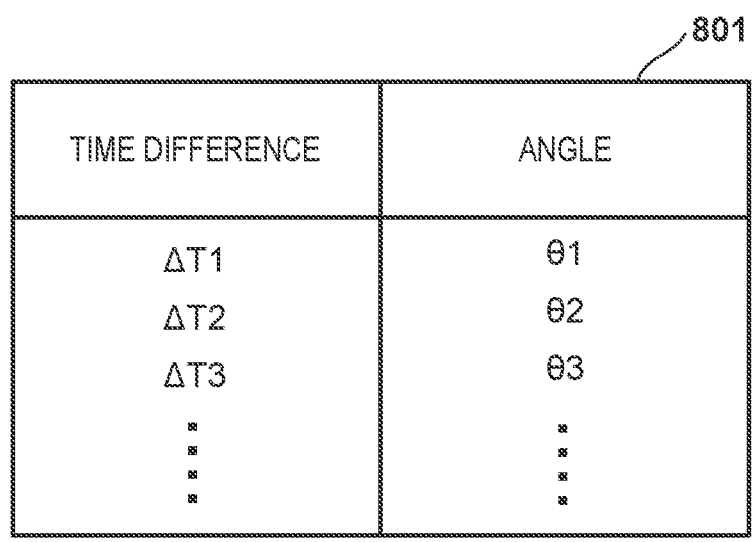
FIG. 8 is a view exemplifying a table in which a time difference has been associated with an angle.

FIG. 8 is a view exemplifying a table 801 in which each time difference is associated with an angle. To specify the angle of the autonomous work machine 10 with respect to the charging station ST, the specification unit C1 can use, for example, the table 801 that associates each time difference with an angle as shown in FIG. 8.

The memory 44c in the ECU 44 stores the table 801 (FIG. 8) that associates the angle of the autonomous work machine 10 with the difference between the periods at which the magnetic field strengths detected by the plurality of the magnetic detection sensors (66L and 66R) reach a predetermined value. The specification unit C1 can also refer to the table 801 to specify the angle of the autonomous work machine 10 based on a shift in the obtained periods.

When the autonomous work machine 10 is to move linearly from the charging position of the charging station ST to the work area AR, the specification unit C1 will specify the angle (for example, the angle θS of FIG. 3B) of the autonomous work machine 10 with respect to the charging station, based on a comparison of the detection results of the magnetic detection sensors 66.

Second Embodiment

The first embodiment described processing for specifying, when an autonomous work machine 10 is to move from a charging station ST to a work area AR, the angle of the autonomous work machine 10 with respect to the charging station ST based on a measured time difference. This embodiment will describe processing for specifying, when the autonomous work machine is to move from the work area AR to the charging station ST, the angle of the autonomous work machine 10 with respect to the charging station ST based on a measured time difference. The arrangement of the autonomous work machine 10 is similar to the arrangement described in the first embodiment.

(Angle Specification Processing)

Figure 9:
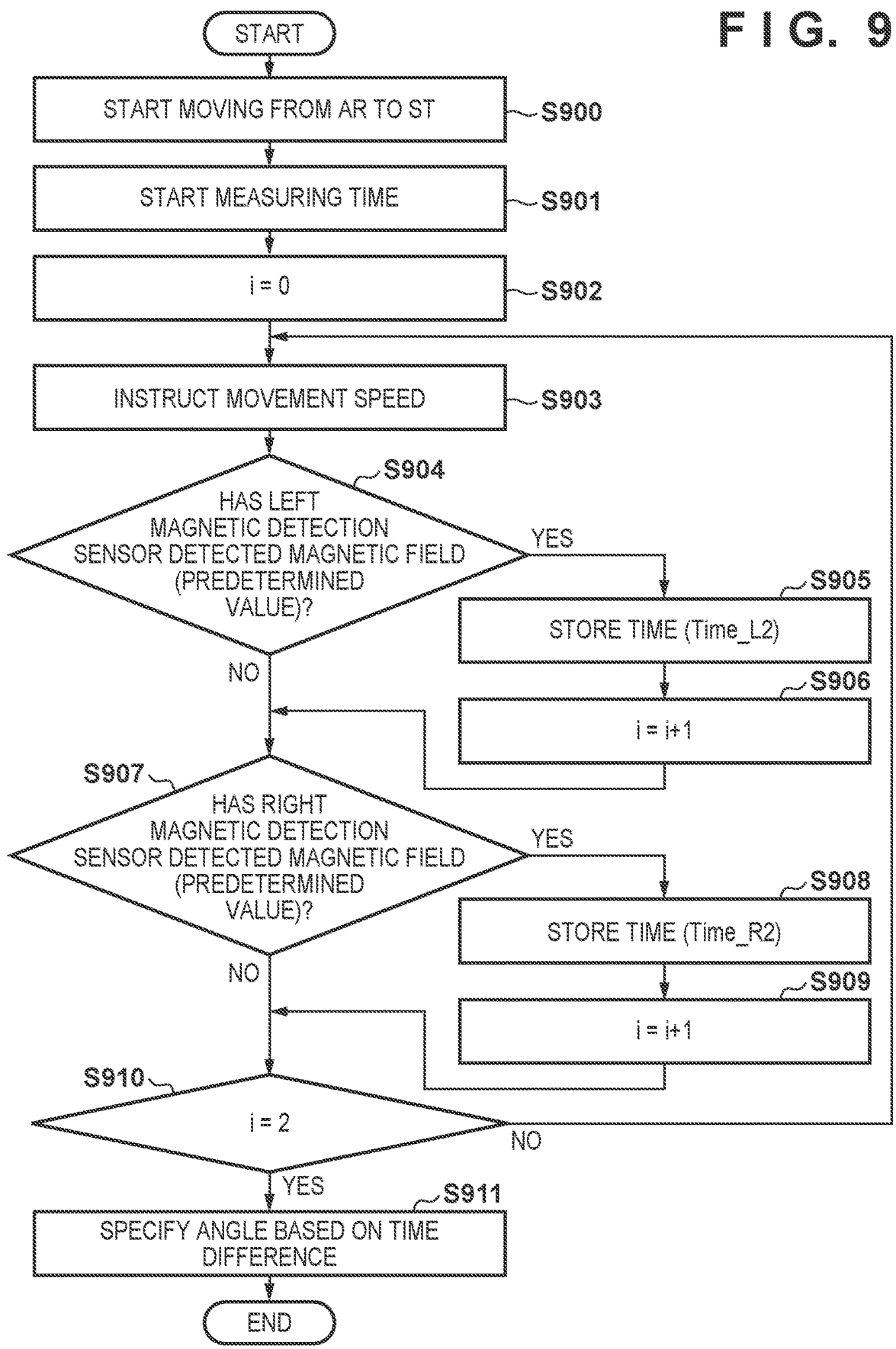
FIG. 9 is a flowchart for explaining the procedure of processing executed by an autonomous work machine according to the second embodiment.

FIG. 9 is a flowchart for explaining the processing procedure executed by the autonomous work machine 10 according to the second embodiment. The processing procedure of FIG. 9 is executed under the overall control of an ECU 44 of the autonomous work machine 10 shown in FIG. 2. Although the basic processing is similar to the processing of FIG. 7, the procedure of processing of FIG. 9 will be described in the point of view of processing executed when the autonomous work machine is to return from the work area AR to the charging station ST.

First, in step S900, when the magnetic field of a station wire 84 has been detected by the magnetic detection sensors 66, the autonomous work machine 10 will start moving, under the control of the ECU 44, to return from the work area AR to the charging station ST. In step S901, together with the start of the movement control for returning to the charging station ST, the ECU 44 starts measuring time by using an internal timer.

In step S902, the ECU 44 initializes a counter i.

In step S903, the ECU 44 controls travel motors 26 (a left travel motor 26L and a right travel motor 26R) by issuing a movement speed instruction. To make the autonomous work machine 10 move linearly from the work area AR to the charging position of the charging station ST, the ECU 44 will control the speed so that the left travel motor 26L and the right travel motor 26R will generate similar driving forces.

In step S904, the ECU 44 determines whether a left magnetic detection sensor 66L has detected a magnetic field strength of a predetermined value. If it is determined that a magnetic field strength of a predetermined value has been detected (YES in step S904), the process advances to step S905.

In step S905, the ECU 44 stores, in a memory 44c (storage unit), a period Time_L2 from the start of the movement control for returning to the charging station ST to the detection of the magnetic field strength of a predetermined value by the left magnetic detection sensor 66L.

In step S906, the ECU 44 counts up the value of the counter i, and advances the process to step S907.

On the other hand, if it is determined that the left magnetic detection sensor 66L has not detected a magnetic field strength of a predetermined value in the determination processing of step S904 (NO in step S904), the process will advance to step S907 without performing the processes of steps S905 and S906.

In step S907, the ECU 44 determines whether a right magnetic detection sensor 66R has detected a magnetic field strength of a predetermined value. If it is determined that a magnetic field strength of a predetermined value has been detected (YES in step S907), the process advances to step S908.

In step S908, the ECU 44 stores, in the memory 44c (storage unit), a period Time_R2 from the start of the movement control for returning to the charging station ST to the detection of the magnetic field strength of a predetermined value by the right magnetic detection sensor 66R.

Subsequently, in step S909, the ECU 44 counts up the value of the counter i and advances the process to step S910.

On the other hand, if it is determined that the right magnetic detection sensor 66R has not detected a magnetic field strength of a predetermined value in the determination processing of step S907 (NO in step S907), the process will advance to step S910 without performing the processes of steps S908 and S909.

In step S910, the ECU 44 determines whether the value of the counter i is 2. If one of the left magnetic detection sensor 66L and the right magnetic detection sensor 66R has not detected a magnetic field strength of a predetermined value or if both of the magnetic detection sensors have not detected a magnetic field strength of a predetermined value (NO in step S910), the ECU 44 will return the process to step S903, and processing will be executed in a similar manner.

On the other hand, since the value of the counter i will be 2 when both the left magnetic detection sensor 66L and the right magnetic detection sensor 66R both have detected a magnetic field strength of a predetermined value (YES in step S910), the ECU 44 will advance the process to step S911.

In step S911, a specification unit C1 will obtain a shift between the periods (time difference) based on the difference between the period Time_L2 and the period Time_R2 stored in the memory 44c, and specify the angle of the autonomous work machine 10 with respect to the charging station ST. The specification unit C1 specifies the angle of the autonomous work machine 10 with respect to the charging station ST by arithmetic processing based on the time difference information of the autonomous work machine 10 which is moving linearly at a predetermined movement speed. In addition, in a similar manner to the first embodiment, the specification unit C1 can refer to a table 801, and the specification unit C1 can specify the angle of the autonomous work machine 10 based on the shift between the obtained periods.

When the autonomous work machine 10 is to move linearly from the work area AR to the charging position of the charging station ST, the specification unit C1 will specify the angle (for example, an angle θR of FIG. 3B) of the autonomous work machine 10 with respect to the charging station, based on a comparison of the detection results of the magnetic detection sensors 66.

(Map Correction Processing)

Figure 10:
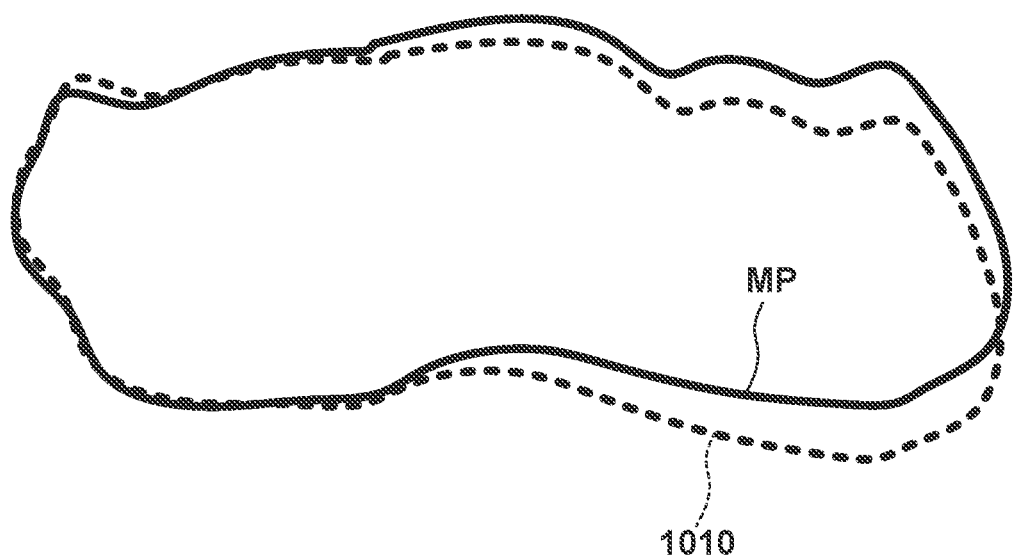
FIG. 10 is a view for schematically explaining the correction of a map.

FIG. 10 is a schematic view for explaining the correction of a map MP. If a shift in the angle between a track (for example, a track 301 of FIG. 3B) for moving from the charging station ST and a track (for example, a track 302 of FIG. 3B) returning to the charging station occurs, the shape of the map MP, which has been generated based on a trace travel operation, will be recognized in a shape (for example, a deformed map 1010 indicated by broken lines in FIG. 10) that is deformed by the amount of the shift between the tracks when the autonomous work machine is to autonomously travel and work in the work area AR next time.

To prevent a deformed shape recognition of the map MP that can occur due to a shift between the track for moving from the charging station ST to the work area and the track for moving from the work area to the charging station, a correction unit C3 will correct the map MP based on a difference between an angle (for example, an angle θS of FIG. 3B), which is specified when the autonomous work machine 10 moves from the charging position of the charging station ST to the work area AR, and an angle (for example, the angle θR of FIG. 3B), which is specified when the autonomous work machine moves from the work area AR to the charging position of the charging station ST.

That is, the shift in the angle is corrected based on the difference between the angles so that the deformed map 1010 indicated by broken lines will return to the map MP that has been generated based on the trace travel operation. Since the correction processing by the correction unit C3 will allow the map MP that has been generated based on the trace travel operation to be correctly recognized even in a case in which a shift in the track has occurred, a control unit C4 can control an autonomous travel operation in the work area AR based on the map corrected by the correction unit C3.

Third Embodiment

The first embodiment and the second embodiment described the arrangement of an autonomous work machine 10 for specifying the angle of the autonomous work machine 10 with respect to a charging station ST based on a measured time difference. This embodiment will describe the arrangement of the autonomous work machine 10 for specifying the angle of the autonomous work machine 10 with respect to the charging station ST based on a difference between the magnetic field strengths detected by a left magnetic detection sensor 66L and a right magnetic detection sensor 66R.

Figure 11:
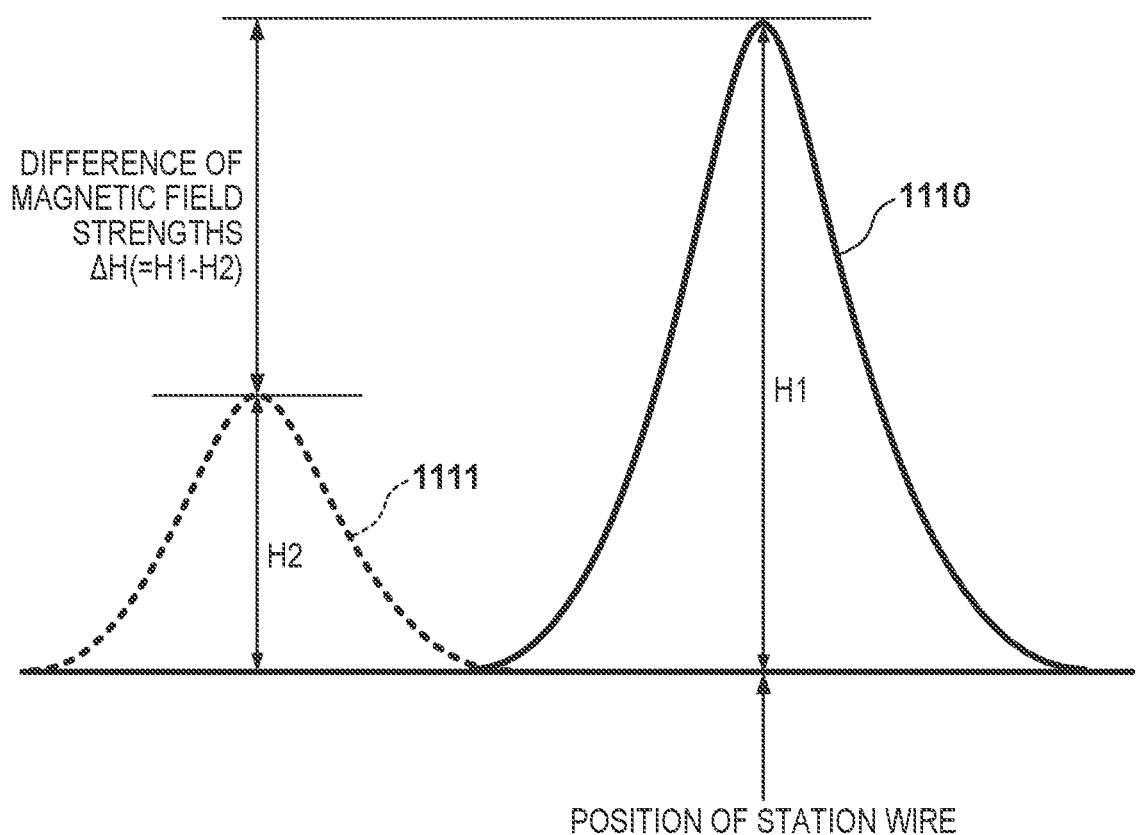
FIG. 11 is a graph exemplifying a magnetic field strength distribution detected by left and right magnetic detection sensors.

FIG. 11 is a graph exemplifying the distributions of magnetic field strengths detected by the left magnetic detection sensor 66L and the right magnetic detection sensor 66R. A distribution 1110 of the magnetic field strength shows the distribution of the magnetic field strength when the right magnetic detection sensor 66R is positioned above a station wire 84, and reference symbol H1 denotes a peak value (predetermined value) of the distribution 1110 of the magnetic field strength. The magnetic field strength H1 corresponds to the predetermined value of the magnetic field strength described in the first embodiment and the second embodiment.

A distribution 1111 of the magnetic field strength shows the distribution of the magnetic field strength of the left magnetic detection sensor 66L, and reference symbol H2 denotes a peak value of the distribution 1111 of the magnetic field strength. In the example of FIG. 11, since the track of the autonomous work machine 10 is inclined, the left magnetic detection sensor 66L has not arrived at the station wire 84 even if the right magnetic detection sensor 66R has arrived at the station wire 84. Hence, the peak value H2 of the distribution 1111 of the magnetic field strength of the left magnetic detection sensor 66L is shown to be lower than the peak value H1 (predetermined value) of the distribution 1110 of the magnetic field strength of the right magnetic detection sensor 66R.

The difference between the peak value H1 (predetermined value) of the distribution 1110 of the magnetic field strength and the peak value H2 of the distribution 1111 of the magnetic field strength can be obtained as a difference ΔH. In a case in which the track of the autonomous work machine 10 is not inclined, the distribution 1111 of the magnetic field strength of the left magnetic detection sensor 66L will become similar to the distribution 1110 of the magnetic field strength of the right magnetic detection sensor 66R, and the difference ΔH between the two magnetic field strengths will be zero. Note that the distributions of the magnetic field strengths shown in FIG. 11 are merely exemplary, and a case in which the distributions of the magnetic field strengths of the left magnetic detection sensor 66L and the right magnetic detection sensor 66R are reversed from those of FIG. 11 can also be understood in a similar manner.

(Angle Specification Processing)

In this embodiment, when the magnetic field strength detected by one magnetic detection sensor of the plurality of magnetic detection sensors (the left magnetic detection sensor 66L and the right magnetic detection sensor 66R) has reached a predetermined value (for example, the peak value H1 of FIG. 11), a specification unit C1 will specify the angle of the autonomous work machine 10 based on a comparison (difference) of the predetermined value (H1) and the magnetic field strength (for example, the peak value H2 of FIG. 11) detected by the other magnetic detection sensor.

FIG. 12 is a flowchart for explaining the processing procedure executed by the autonomous work machine 10 according to the third embodiment. The processing procedure of FIG. 12 is executed under the overall control of an ECU 44 of the autonomous work machine 10 shown in FIG. 2.

First, in step S1201, the ECU 44 determines whether the magnetic field strength detected by one of the plurality of magnetic detection sensors (the left magnetic detection sensor 66L and the right magnetic detection sensor 66R) has reached a predetermined value. If it is determined that neither the magnetic field strength detected by the left magnetic detection sensor 66L nor the magnetic field strength detected by the right magnetic detection sensor 66R has reached the predetermined value (NO in step S1201), this processing is executed again.

On the other hand, if it is determined that the magnetic field strength detected by one magnetic detection sensor of the left and right magnetic detection sensors has reached the predetermined value (for example, the peak value H1 of FIG. 11) (YES in step S1201), the process advances to step S1202.

In step S1202, the ECU 44 obtains the magnetic field strength (for example, the peak value H2 of FIG. 11) detected by the other magnetic detection sensor.

Subsequently, in step S1203, the specification unit C1 specifies the angle of the autonomous work machine 10 based on a comparison (the magnetic field strength difference) of the predetermined value and the magnetic field strength detected by the other magnetic detection sensor.

FIG. 13 is a view exemplifying a table 1301 in which each magnetic field strength difference is associated with an angle. The specification unit C1 can use, for example, the table 1301 associating each magnetic field strength with an angle, as shown in FIG. 13, to specify the angle of the autonomous work machine 10 with respect to the charging station ST.

A memory 44c (storage unit) in the ECU 44 stores the table 1301 (FIG. 13) that associates the difference between the predetermined value and the magnetic field strength detected by the other magnetic detection sensor with the angle of the autonomous work machine 10. The specification unit C1 can refer to the table 1301 and specify the angle of the autonomous work machine based on the difference between the predetermined value and the magnetic field strength detected by the other magnetic detection sensor.

Summary of Embodiments

Arrangement 1. An autonomous work machine according to the above-described embodiment is an autonomous work machine (for example, 10 of FIG. 1) that works in a work area (for example, AR of FIG. 3A) while autonomously traveling in the work area, characterized by comprising:

a plurality of magnetic detection sensors (for example, 66L, 66R of FIG. 5) each configured to detect a magnetic field during energization of a station wire (for example, 84 of FIG. 3B) which is configured to guide the autonomous work machine (10) to a charging station (for example, ST of FIG. 4) for power supply; and a specification unit (for example, C1 of FIG. 2) configured to specify, when the autonomous work machine (10) is to move from a charging position of the charging station (ST) to the work area (AR) or when the autonomous work machine is to move from the work area (AR) to the charging position, an angle of the autonomous work machine (10) with respect to the charging station (ST) based on a comparison of detection results of the magnetic detection sensors (66L, 66R).

According to the autonomous work machine of Arrangement 1, the angle of the autonomous work machine with respect to the charging station can be specified. As a result, the accuracy of position recognition can be improved, and the map can be correctly recognized even when the track has shifted.

Arrangement 2. In the autonomous work machine according to the above-described embodiment, when the autonomous work machine (10) is to move from the charging position of the charging station (ST) to the worked area (AR), the specification unit (C1) obtains, for each of the plurality of magnetic detection sensors (66L, 66R), a period from the start of the movement of the autonomous work machine (10) until a magnetic field strength detected by the magnetic detection sensor reaches a predetermined value, and specifies the angle of the autonomous work machine (10) with respect to the charging station (ST) based on a shift between the obtained periods.

According to the autonomous work machine of Arrangement 2, when the autonomous work machine is to move from the charging position of the charging station to the worked area, the angle of the autonomous work machine with respect to the charging station can be specified based on a shift between the obtained periods.

Arrangement 3. In the autonomous work machine according to the above-described embodiment, when the autonomous work machine (10) is to move from the work area (AR) to the charging position of the charging station (ST), the specification unit (C1) obtains, for each of the plurality of magnetic detection sensors (66L, 66R), a period from the start of movement control for returning to the charging station (ST) until a magnetic field strength detected by the magnetic detection sensor reaches a predetermined value, and specifies the angle of the autonomous work machine (10) with respect to the charging station (ST) based on a shift between the obtained periods.

According to the autonomous work machine of Arrangement 3, when the autonomous work machine is to move from the worked area to the charging position of the charging station, the angle of the autonomous work machine with respect to the charging station can be specified based on a shift between the obtained periods.

Arrangement 4. In the autonomous work machine according to the above-described embodiment, when a magnetic field strength detected by a first magnetic detection sensor of the plurality of magnetic detection sensors (66L, 66R) has reached a predetermined value, the specification unit (C1) specifies, based on a comparison of the predetermined value and a magnetic field strength detected by a second magnetic detection sensor, the angle of the autonomous work machine (10) with respect to the charging station (ST).

According to the autonomous work machine of Arrangement 4, the angle of the autonomous work machine with respect to the charging station can be specified based on a comparison (difference) of the magnetic field strengths detected by the plurality of magnetic detection sensors.

Arrangement 5. In the autonomous work machine according to the above-described embodiment, each of the plurality of magnetic detection sensors (66L, 66R) can further detect a magnetic field during energization of an area wire (for example, 82 of FIG. 3A) installed along a perimeter of the work area (AR), and the autonomous work machine (10) starts moving from the charging position of the charging station (ST), travels along the perimeter of the worked area (AR) based on the magnetic field of the area wire (82), and returns to the charging position of the charging station (ST).

Arrangement 6. The autonomous work machine according to the above-described embodiment is characterized by further comprising:

a generation unit (for example, C2 of FIG. 2) configured to generate, based on position information obtained during the travel along the perimeter of the work area (AR), a map (for example, MP of FIG. 6) showing a shape of the work area (AR); and a correction unit (for example, C3 of FIG. 2) configured to correct the map (MP) based on a difference between an angle specified when the autonomous work machine (10) moves from the charging position of the charging station (ST) to the work area (AR) and an angle specified when the autonomous work machine moves from the work area (AR) to the charging position.

According to the autonomous work machine of Arrangement 5 and Arrangement 6, even in a case in which a shift occurs between the track for moving from the charging station to the work area and the track for moving from the work area to the charging station, the map can be correctly recognized by executing correction processing.

Arrangement 7. In the autonomous work machine according to the above-described embodiment, when the autonomous work machine (10) is to move linearly from the charging position of the charging station (ST) to the worked area (AR), the specification unit (C1) specifies, based on a comparison of detection results of the magnetic detection sensors (66L, 66R), the angle of the autonomous work machine (10) with respect to the charging station (ST), and when the autonomous work machine (10) is to move linearly from the work area (AR) to the charging position, the specification unit specifies, based on the comparison of the detection results of the magnetic detection sensors (66L, 66R), the angle of the autonomous work machine (10) with respect to the charging station (ST).

According to the autonomous work machine of Arrangement 7, the angle of the autonomous work machine with respect to the charging station can be specified. As a result, the accuracy of position recognition can be improved, and the map can be correctly recognized even when the track has shifted.

Arrangement 8. The autonomous work machine according to the above-described embodiment is characterized by further comprising:

a control unit (for example, C4 of FIG. 2) configured to control, based on the corrected map, an autonomous travel operation in the work area.

According to the autonomous work machine of Arrangement 8, the autonomous travel operation in the work area can be controlled based on the corrected map.

Arrangement 9. The autonomous work machine according to the above-described embodiment further comprises a storage unit (for example, 44c of FIG. 2) configured to store a table (for example, 801 of FIG. 8) associating the angle of the autonomous work machine (10) with the time difference between the periods until the magnetic field strengths detected by the plurality of magnetic detection sensors (66L, 66R) reach the predetermined value, and the specification unit (C1) refers to the table (801) and specifies the angle of the autonomous work machine (10) based on a shift between the obtained periods.

According to the autonomous work machine of Arrangement 9, the angle of the autonomous work machine with respect to the charging station can be specified based on a shift between the obtained periods.

Arrangement 10. The autonomous work machine according to the above-described embodiment further comprises a storage unit (for example, 44c of FIG. 2) configured to store a table (for example, 1301 of FIG. 13) associating the angle of the autonomous work machine with the difference between the predetermined value and the magnetic field strength detected by the second magnetic detection sensor, and the specification unit (C1) refers to the table (1301) and specifies the angle of the autonomous work machine based on the difference between the predetermined value and the magnetic field strength detected by the second magnetic detection sensor.

According to the autonomous work machine of Arrangement 10, the angle of the autonomous work machine with respect to the charging station can be specified based on a comparison (difference) of magnetic field strengths detected by the plurality of magnetic detection sensors.

Arrangement 11. An autonomous work system according to the above-described embodiment is an autonomous work system that includes an autonomous work machine (for example, 10 of FIG. 1) configured to work in a work area (AR) while autonomously traveling in the work area and a charging station (for example, ST of FIG. 4) configured to supply power to the autonomous work machine (10), characterized in that the charging station (ST) causes a current to flow in a station wire (for example, 84 of FIG. 3B), which is arranged so a distance from a reference position (for example, the point P of FIG. 3B) of the charging station (ST) is not constant, to generate a magnetic field for guiding the autonomous work machine (10) to the charging station (ST), and the autonomous work machine (10) comprises a plurality of magnetic detection sensors (for example, 66L, 66R of FIG. 5) each configured to detect the magnetic field during energization of the station wire (84), and a specification unit (for example, C1 of FIG. 2) configured to specify, when the autonomous work machine (10) is to move from a charging position of the charging station (ST) to the work area (AR) or the autonomous work machine is to move from the work area (AR) to the charging position, an angle of the autonomous work machine (10) with respect to the charging station (ST) based on a comparison of detection results of the magnetic detection sensors (66L, 66R).

According to the autonomous work system of Arrangement 11, the angle of the autonomous work machine with respect to the charging station can be specified. As a result, the accuracy of position recognition can be improved, and the map can be correctly recognized even when the track has shifted.

Arrangement 12. In the autonomous work system according to the above-described embodiment, the station wire (84) is characterized by comprising a first station wire portion (for example, 84*a* of FIG. 3B) that is arranged in a direction which intersects with the charging station (ST) in the work area (AR), and a second station wire portion (for example, 84*b* of FIG. 3B) that is arranged in a direction which does not intersect with the charging station (ST), and the station wire has a rectangular wiring structure in which the first station wire portion (84*a*) is longer than the second station wire portion (84*b*).

According to the autonomous work system of Arrangement 12, when the autonomous work system is to move above the first station wire portion (the long side of the rectangle) of the station wire, it is possible to prevent the magnetic detection sensors from being influenced by the magnetic field from the side of the second short wire portion (the short side of the rectangle) of the station wire. As a result, the autonomous work machine can specify the angle of the autonomous work machine with respect to the charging station based on a shift between the obtained periods. Alternatively, the autonomous work machine can specify the angle of the autonomous work machine with respect to the charging station based on a comparison (difference) of the magnetic field strengths detected by the plurality of magnetic detection sensors.

Arrangement 13. A method of controlling an autonomous work machine according to the above-described embodiment is a method of controlling an autonomous work machine (for example, 10 of FIG. 1) that works in a work area (for example, AR of FIG. 3A) while autonomously traveling in the work area and comprises a plurality of magnetic detection sensors (for example, 66L, 66R of FIG. 5) each configured to detect a magnetic field during energization of a station wire (for example, 84 of FIG. 3B) for guiding the autonomous work machine to a charging station (for example, ST of FIG. 4) for power supply, the method characterized by comprising:

a specification step of specifying, when the autonomous work machine (10) is to move from a charging position of the charging station (ST) to the work area (AR) or when the autonomous work machine is to move from the work area (AR) to the charging position, an angle of the autonomous work machine (10) with respect to the charging station (ST) based on a comparison of detection results of the magnetic detection sensors (66L, 66R).

According to the method of controlling the autonomous work machine of Arrangement 13, the angle of the autonomous work machine with respect to the charging station can be specified. As a result, the accuracy of position recognition can be improved, and the map can be correctly recognized even when the track has shifted.

Arrangement 14. A program according to the above-described embodiment causes a computer to function as each unit of an autonomous work machine defined in any one of Arrangements 1 to 10.

According to the program of Arrangement 14, the function of the autonomous work machine according to the present invention can be implemented by a computer.

The present invention is not limited to the above embodiments and various changes and modifications can be made within the spirit and scope of the present invention. Therefore, to apprise the public of the scope of the present invention, the following claims are made.

What is claimed is:

1. An autonomous work machine that works in a work area while autonomously traveling in the work area, comprising:

a plurality of magnetic detection sensors each configured to detect a magnetic field during energization of a station wire which is configured to guide the autonomous work machine to a charging station for power supply;

a specification unit configured to specify, when the autonomous work machine is to move from a charging position of the charging station to the work area or when the autonomous work machine is to move from the work area to the charging position, an angle of the autonomous work machine with respect to the charging station based on a comparison of detection results of the magnetic detection sensors; and a correction unit configured to correct a map showing a shape of the work area, based on a difference between an angle specified when the autonomous work machine moves from the charging position of the charging station to the work area and an angle specified when the autonomous work machine moves from the work area to the charging position.

2. The autonomous work machine according to claim 1, wherein when the autonomous work machine is to move from the charging position of the charging station to the worked area, the specification unit obtains, for each of the plurality of magnetic detection sensors, a period from the start of the movement of the autonomous work machine until a magnetic field strength detected by the magnetic detection sensor reaches a predetermined value, and specifies the angle of the autonomous work machine with respect to the charging station based on a shift between the obtained periods.

3. The autonomous work machine according to claim 1, wherein when the autonomous work machine is to move from the work area to the charging position of the charging station, the specification unit obtains, for each of the plurality of magnetic detection sensors, a period time from the start of movement control for returning to the charging station until a magnetic field strength detected by the magnetic detection sensor reaches a predetermined value, and specifies the angle of the autonomous work machine with respect to the charging station based on a shift between the obtained periods.

4. The autonomous work machine according to claim 1, wherein when a magnetic field strength detected by a first magnetic detection sensor of the plurality of magnetic detection sensors has reached a predetermined value, the specification unit specifies, based on a comparison of the predetermined value and a magnetic field strength detected by a second magnetic detection sensor, the angle of the autonomous work machine with respect to the charging station.

5. The autonomous work machine according to claim 1, wherein each of the plurality of magnetic detection sensors can further detect a magnetic field during energization of an area wire installed along a perimeter of the work area, and the autonomous work machine starts moving from the charging position of the charging station, travels along the perimeter of the worked area based on the magnetic field of the area wire, and returns to the charging position of the charging station.

6. The autonomous work machine according to claim 5, further comprising:

a generation unit configured to generate, based on position information obtained during the travel along the perimeter of the work area, the map showing the shape of the work area.

7. The autonomous work machine according to claim 1, wherein when the autonomous work machine is to move linearly from the charging position of the charging station to the worked area, the specification unit specifies, based on a comparison of detection results of the magnetic detection sensors, the angle of the autonomous work machine with respect to the charging station, and when the autonomous work machine is to move linearly from the work area to the charging position, the specification unit specifies, based on the comparison of the detection results of the magnetic detection sensors, the angle of the autonomous work machine with respect to the charging station.

8. The autonomous work machine according to claim 1, further comprising:

a control unit configured to control, based on the corrected map, an autonomous travel operation in the work area.

9. The autonomous work machine according to claim 2, further comprising:

a storage unit configured to store a table associating the angle of the autonomous work machine with the time difference between the periods until the magnetic field strengths detected by the plurality of magnetic detection sensors reach the predetermined value, and the specification unit refers to the table and specifies the angle of the autonomous work machine based on a shift between the obtained periods.

10. The autonomous work machine according to claim 4, further comprising:

a storage unit configured to store a table associating the angle of the autonomous work machine with the difference between the predetermined value and the magnetic field strength detected by the second magnetic detection sensor, and the specification unit refers to the table and specifies the angle of the autonomous work machine based on the difference between the predetermined value and the magnetic field strength detected by the second magnetic detection sensor.

11. An autonomous work system that includes an autonomous work machine configured to work in a work area while autonomously traveling in the work area and a charging station configured to supply power to the autonomous work machine, wherein the charging station causes a current to flow in a station wire, which is arranged so a distance from a reference position of the charging station is not constant, to generate a magnetic field for guiding the autonomous work machine to the charging station, and the autonomous work machine comprises a plurality of magnetic detection sensors each configured to detect the magnetic field during energization of the station wire, a specification unit configured to specify, when the autonomous work machine is to move from a charging position of the charging station to the work area or the autonomous work machine is to move from the work area to the charging position, an angle of the autonomous work machine with respect to the charging station based on a comparison of detection results of the magnetic detection sensors; and a correction unit configured to correct a map showing a shape of the work area, based on a difference between an angle specified when the autonomous work machine moves from the charging position of the charging station to the work area and an angle specified when the autonomous work machine moves from the work area to the charging position.

12. The autonomous work system according to claim 11, wherein the station wire comprises a first station wire portion that is arranged in a direction which intersects with the charging station in the work area, and a second station wire portion that is arranged in a direction which does not intersect with the charging station, and the station wire has a rectangular wiring structure in which the first station wire portion is longer than the second station wire portion.

13. A method of controlling an autonomous work machine that works in a work area while autonomously traveling in the work area and comprises a plurality of magnetic detection sensors each configured to detect a magnetic field during energization of a station wire for guiding the autonomous work machine to a charging station for power supply, the method comprising:

specifying, when the autonomous work machine is to move from a charging position of the charging station to the work area or when the autonomous work machine is to move from the work area to the charging position, an angle of the autonomous work machine with respect to the charging station based on a comparison of detection results of the magnetic detection sensors; and correcting a map showing a shape of the work area, based on a difference between an angle specified when the autonomous work machine moves from the charging position of the charging station to the work area and an angle specified when the autonomous work machine moves from the work area to the charging position.

14. A storage medium that stores a program for causing a computer to function as each unit of an autonomous work machine defined in claim 1.

* * * * *